United States Patent
Kahlon et al.

(10) Patent No.: US 9,704,120 B2
(45) Date of Patent: *Jul. 11, 2017

(54) INVENTORY BALANCE COMMON OBJECT

(75) Inventors: Paramjit Kahlon, San Mateo, CA (US); Nardo B. Catahan, Jr., S. San Francisco, CA (US); Shailendra Garg, Sunnyvale, CA (US); Maria Theresa Barnes-Leon, Fremont, CA (US); Ramaswamy Sundararajan, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2707 days.

This patent is subject to a terminal disclaimer.

(21) Appl. No.: 10/696,097

(22) Filed: Oct. 28, 2003

(65) Prior Publication Data

US 2007/0214063 A1  Sep. 13, 2007

Related U.S. Application Data

(60) Provisional application No. 60/457,434, filed on Mar. 24, 2003.

(51) Int. Cl.
*G06Q 10/08*  (2012.01)
*G06Q 20/20*  (2012.01)

(52) U.S. Cl.
CPC ......... *G06Q 10/087* (2013.01); *G06Q 20/203* (2013.01)

(58) Field of Classification Search
CPC .......................... G06Q 20/203; G06Q 10/087
USPC ..................................................... 705/22, 28
See application file for complete search history.

(56) References Cited

U.S. PATENT DOCUMENTS

| | | | |
|---|---|---|---|
| 4,714,995 A | 12/1987 | Materna et al. | 364/200 |
| 5,220,500 A | 6/1993 | Baird et al. | 705/36 R |
| 5,311,438 A | 5/1994 | Sellers et al. | 700/96 |
| 5,349,643 A | 9/1994 | Cox et al. | 380/25 |
| 5,416,917 A | 5/1995 | Adair et al. | 707/203 |
| 5,446,880 A * | 8/1995 | Balgeman et al. | |
| 5,566,332 A | 10/1996 | Adair et al. | 707/101 |
| 5,646,862 A | 7/1997 | Jolliffe et al. | 703/1 |
| 5,699,527 A | 12/1997 | Davidson | 705/38 |
| 5,708,828 A * | 1/1998 | Coleman | 715/205 |

(Continued)

FOREIGN PATENT DOCUMENTS

| | | | | |
|---|---|---|---|---|
| DE | 101 50 391 A1 | 5/2002 | | G06F 17/30 |
| JP | 2001 256308 | 9/2001 | | G06F 17/60 |

(Continued)

OTHER PUBLICATIONS

"Cross Access Introduces SERIESfour; Offers Native, Fast, Scalable Legacy Data Connectivity for Data Marts, ERP Applications," PR Newswire; New York; Jan. 18, 1999; pp. 1-3. Downloaded from http://proquest.umit.com.

(Continued)

*Primary Examiner* — Ramsey Refai
(74) *Attorney, Agent, or Firm* — Sheppard, Mullin, Richter & Hampton LLP

(57) ABSTRACT

Stored inventory balance information in a first format for use by a first computerized system is transformed to readily make the stored inventory balance information available for use in a second computerized system that utilizes a second format in a cost-efficient and time-efficient manner.

27 Claims, 14 Drawing Sheets

(56) References Cited

U.S. PATENT DOCUMENTS

| | | | |
|---|---|---|---|
| 5,724,575 A | 3/1998 | Hoover et al. | 707/10 |
| 5,727,158 A | 3/1998 | Bouziane et al. | 709/225 |
| 5,742,588 A | 4/1998 | Thornberg et al. | 370/236 |
| 5,758,355 A | 5/1998 | Buchanan | 707/201 |
| 5,764,543 A | 6/1998 | Kennedy | 703/2 |
| 5,806,075 A | 9/1998 | Jain et al. | 707/201 |
| 5,930,156 A | 7/1999 | Kennedy | 703/6 |
| 5,930,764 A | 7/1999 | Melchione et al. | 705/10 |
| 5,953,710 A | 9/1999 | Fleming | 705/38 |
| 5,970,490 A | 10/1999 | Morgenstern | 707/10 |
| 5,983,194 A | 11/1999 | Hogge et al. | 705/7 |
| 6,032,136 A | 2/2000 | Brake et al. | 705/41 |
| 6,053,947 A | 4/2000 | Parson | 703/14 |
| 6,167,380 A | 12/2000 | Kennedy et al. | 705/10 |
| 6,178,418 B1 | 1/2001 | Singer | 707/3 |
| 6,182,053 B1* | 1/2001 | Rauber et al. | 705/28 |
| 6,216,130 B1 | 4/2001 | Hougaard et al. | 707/10 |
| 6,226,649 B1 | 5/2001 | Bodamer et al. | 707/104.1 |
| 6,233,566 B1 | 5/2001 | Levine et al. | 705/36 R |
| 6,236,997 B1 | 5/2001 | Bodamer et al. | 707/10 |
| 6,275,812 B1 | 8/2001 | Haq et al. | 705/11 |
| 6,336,124 B1 | 1/2002 | Alam et al. | 715/523 |
| 6,341,289 B1 | 1/2002 | Burroughs et al. | 707/104.1 |
| 6,343,275 B1 | 1/2002 | Wong | 705/26 |
| 6,377,952 B1 | 4/2002 | Inohara et al. | 707/101 |
| 6,385,620 B1 | 5/2002 | Kurzius et al. | 707/104.1 |
| 6,434,567 B1 | 8/2002 | De La Huerga | 707/102 |
| 6,463,430 B1 | 10/2002 | Brady et al. | 707/3 |
| 6,556,950 B1 | 4/2003 | Schwenke et al. | 702/183 |
| 6,569,207 B1 | 5/2003 | Sundaresan | 715/234 |
| 6,591,260 B1 | 7/2003 | Schwarzhoff et al. | 702/2 |
| 6,631,382 B1 | 10/2003 | Kouchi et al. | 707/102 |
| 6,668,253 B1 | 12/2003 | Thompson et al. | 707/10 |
| 6,681,223 B1 | 1/2004 | Sundaresan | 707/6 |
| 6,738,975 B1 | 5/2004 | Yee et al. | 719/310 |
| 6,754,679 B2 | 6/2004 | Oheda | 754/200 |
| 6,778,651 B1 | 8/2004 | Jost et al. | 379/201.01 |
| 6,792,431 B2 | 9/2004 | Tamboli et al. | 707/102 |
| 6,826,542 B1 | 11/2004 | Virgin et al. | 705/34 |
| 6,826,568 B2 | 11/2004 | Bernstein et al. | 707/6 |
| 6,828,963 B1 | 12/2004 | Rappoport | 345/419 |
| 6,883,004 B2 | 4/2005 | Bahl et al. | 707/10 |
| 6,889,260 B1 | 5/2005 | Hughes | 709/246 |
| 6,898,783 B1 | 5/2005 | Gupta et al. | 717/105 |
| 6,912,719 B2 | 6/2005 | Elderon et al. | 719/314 |
| 6,944,514 B1 | 9/2005 | Matheson | 700/98 |
| 6,947,947 B2 | 9/2005 | Block et al. | 707/102 |
| 6,961,760 B2 | 11/2005 | Li et al. | 709/219 |
| 6,996,776 B1 | 2/2006 | Makely et al. | 715/207 |
| 7,013,485 B2 | 3/2006 | Brown et al. | 726/27 |
| 7,043,687 B2 | 5/2006 | Knauss et al. | 715/236 |
| 7,062,540 B2 | 6/2006 | Reddy et al. | 709/217 |
| 7,065,499 B1 | 6/2006 | Seth et al. | 705/26 |
| 7,085,729 B1 | 8/2006 | Kennedy et al. | 705/10 |
| 7,093,200 B2 | 8/2006 | Schreiber et al. | 715/835 |
| 7,099,350 B2 | 8/2006 | Peterson | 370/465 |
| 7,111,010 B2 | 9/2006 | Chen | 707/102 |
| 7,111,077 B1 | 9/2006 | Starkovich et al. | 709/246 |
| 7,124,112 B1 | 10/2006 | Guyan et al. | 705/44 |
| 7,133,882 B1 | 11/2006 | Pringle et al. | |
| 7,139,766 B2 | 11/2006 | Thomson et al. | 707/101 |
| 7,143,100 B2 | 11/2006 | Carlson et al. | 707/101 |
| 7,162,540 B2 | 1/2007 | Jasen et al. | 709/242 |
| 7,257,594 B2 | 8/2007 | Tamboli et al. | 701/101 |
| 7,257,820 B2 | 8/2007 | Fischer et al. | 719/316 |
| 7,287,041 B2 | 10/2007 | Barnes-Leon et al. | 707/104.1 |
| 7,337,192 B2 | 2/2008 | Stark et al. | 707/104.1 |
| 7,349,861 B1 | 3/2008 | Fischer et al. | 705/7 |
| 7,370,009 B1 | 5/2008 | Notani et al. | 705/28 |
| 7,412,404 B1 | 8/2008 | Tenorio | 715/236 |
| 7,680,818 B1 | 3/2010 | Fan et al. | 707/999.103 |
| 2001/0011245 A1 | 8/2001 | Duhon | 705/38 |
| 2001/0051907 A1 | 12/2001 | Kumar et al. | 705/36 |
| 2002/0007343 A1 | 1/2002 | Oyama et al. | 705/39 |
| 2002/0019765 A1 | 2/2002 | Mann et al. | 705/11 |
| 2002/0023004 A1 | 2/2002 | Hollander et al. | 705/22 |
| 2002/0035431 A1 | 3/2002 | Ell | 702/5 |
| 2002/0035488 A1 | 3/2002 | Aquila et al. | 705/4 |
| 2002/0040313 A1 | 4/2002 | Hunter et al. | 705/9 |
| 2002/0040339 A1 | 4/2002 | Dhar et al. | 705/38 |
| 2002/0085020 A1 | 7/2002 | Carroll, Jr. | 345/700 |
| 2002/0095456 A1 | 7/2002 | Wensheng | 709/203 |
| 2002/0116234 A1 | 8/2002 | Nagasawa | 705/5 |
| 2002/0123983 A1 | 9/2002 | Riley et al. | 707/1 |
| 2002/0133510 A1 | 9/2002 | Lau | 707/203 |
| 2002/0138582 A1 | 9/2002 | Chandra et al. | 709/206 |
| 2002/0169863 A1 | 11/2002 | Beckwith et al. | 709/223 |
| 2002/0169867 A1 | 11/2002 | Mann et al. | 709/224 |
| 2002/0174417 A1 | 11/2002 | Sijacic et al. | 717/147 |
| 2002/0178077 A1* | 11/2002 | Katz et al. | 705/26 |
| 2002/0184085 A1 | 12/2002 | Lindia et al. | 705/11 |
| 2002/0184148 A1 | 12/2002 | Kahn et al. | 705/40 |
| 2002/0188513 A1 | 12/2002 | Gil et al. | 705/22 |
| 2002/0188538 A1 | 12/2002 | Robertson et al. | 705/35 |
| 2003/0014440 A1 | 1/2003 | Bussert et al. | 715/239 |
| 2003/0018502 A1 | 1/2003 | Rodriguez | 705/7 |
| 2003/0023580 A1 | 1/2003 | Braud et al. | 703/3 |
| 2003/0033437 A1 | 2/2003 | Fischer et al. | 709/310 |
| 2003/0071852 A1 | 4/2003 | Stimac | 345/810 |
| 2003/0097642 A1 | 5/2003 | Arai et al. | 716/1 |
| 2003/0110104 A1* | 6/2003 | King et al. | 705/28 |
| 2003/0131018 A1 | 7/2003 | Godoy et al. | 707/104.1 |
| 2003/0163597 A1 | 8/2003 | Hellman et al. | 709/316 |
| 2003/0163603 A1 | 8/2003 | Fry et al. | 709/328 |
| 2003/0229529 A1 | 12/2003 | Mui et al. | 705/8 |
| 2004/0002982 A1 | 1/2004 | Ersek et al. | |
| 2004/0015515 A1 | 1/2004 | Beisiegel et al. | 707/103 Y |
| 2004/0034661 A1 | 2/2004 | Barron et al. | 707/104.1 |
| 2004/0039576 A1 | 2/2004 | He et al. | 705/1 |
| 2004/0093351 A1 | 5/2004 | Lee et al. | 707/104.1 |
| 2004/0122826 A1 | 6/2004 | Mackie | 707/100 |
| 2004/0128188 A1 | 7/2004 | Leither et al. | 705/11 |
| 2004/0162773 A1 | 8/2004 | Del Rey et al. | 705/36 |
| 2004/0199536 A1 | 10/2004 | Barnes Leon et al. | 707/102 |
| 2004/0215503 A1 | 10/2004 | Allpress et al. | 705/11 |
| 2004/0249854 A1 | 12/2004 | Barnes-Leon et al. | 703/103 Y |
| 2005/0021383 A1 | 1/2005 | Fliess et al. | 705/8 |
| 2005/0021391 A1 | 1/2005 | Lu et al. | 705/11 |
| 2005/0091249 A1 | 4/2005 | Hanson et al. | 707/101 |
| 2005/0160361 A1 | 7/2005 | Young | 715/513 |
| 2005/0197880 A1 | 9/2005 | Walsh et al. | 705/8 |
| 2006/0271446 A1 | 11/2006 | Barnes-Leon et al. | 705/26 |
| 2007/0033531 A1 | 2/2007 | Marsh | 715/738 |
| 2007/0203710 A1 | 8/2007 | Habichler et al. | 705/1 |
| 2007/0208577 A1 | 9/2007 | Barnes-Leon et al. | 705/1 |
| 2007/0208878 A1 | 9/2007 | Barnes-Leon et al. | 709/246 |
| 2007/0214020 A1 | 9/2007 | Srinivasan et al. | 705/4 |
| 2007/0214063 A1 | 9/2007 | Kahlon et al. | 705/28 |
| 2007/0214064 A1 | 9/2007 | Kahlon et al. | 705/28 |
| 2007/0214065 A1 | 9/2007 | Kahlon et al. | 705/28 |
| 2007/0225949 A1 | 9/2007 | Sundararajan et al. | 703/2 |
| 2007/0226037 A1 | 9/2007 | Garg et al. | 705/1 |
| 2007/0226049 A1 | 9/2007 | Muralitharan et al. | 705/11 |
| 2007/0226093 A1 | 9/2007 | Chan et al. | 705/38 |
| 2007/0250408 A1 | 10/2007 | Barnes-Leon et al. | 707/100 |
| 2007/0250419 A1 | 10/2007 | Kumar et al. | 705/34 |
| 2007/0265944 A1 | 11/2007 | Catahan, Jr. et al. | 705/30 |

FOREIGN PATENT DOCUMENTS

| | | | | |
|---|---|---|---|---|
| WO | WO 0143031 | 6/2001 | | |
| WO | WO 0188759 A1 | 11/2001 | | G06F 14/30 |
| WO | WO 03/003641 A2 | 1/2003 | | |

OTHER PUBLICATIONS

Hardwick, Martin, David L. Spooner, Rom Rando, and K.C. Morris, "Sharing Manufacturing Information in Virtual Enterprises;" Communication of the ACM; vol. 39, No. 2; Feb. 1996; pp. 46-54. Downloaded from http://delivery.acm.org.

Kappelhoff, Ralph, "Integration of ERP to the Final Control Elements;" ISA Transactions; 1998; vol. 36, No. 4; pp. 229-238. Downloaded from http://www.sciencedirect.com.

(56) References Cited

OTHER PUBLICATIONS

Nori, Anil K. et al., "Bringing Objects to the Mainstream," Compcon Proceedings, IEEE San Jose, California, Feb. 23-26, 1997, pp. 136-142.

PTC: Siebel Systems and PTC create strategic alliance to leverage enriched information across product development, sales and service; Combination of Siebel eBusiness Applications and PTC Collaborative Product Development solutions to deliver competitive advantage, M2 Presswire, Conventry: Jan. 24, 2002, 3 pages (retrieved from ProQuest.com).

Wilson, J.R., "Aerospace Looks for Lift from e-commerce," Intervia, Geneva, Jul./Aug. 2001; vol. 56, Issue 655, 6 pages (retrieved from ProQuest.com).

XML/EDI Group. "Guidelines for using XML for Electronic Data Interchange." Presented at XML One-San Jose, Sep./Oct. 2001. Downloaded from http://web.archive.org/web/20040413182700/http://www.xmledi-group.org/.

NPL_XML_Schema_CE.pdf, A tutorial published by the SML governing body of w3.org regarding the use of SML Schemas and Complex Data Elements. Downloaded on Jun. 10, 2009 from http://www.w3schools.com/Schema/schema_intro.asp? and http://www.w3schools.com/Schema/schema_complex.asp? and http://www.w3.schools.com/Schema/schema_complex_empty.asp?;7 pages.

Routledge et al., UML and XML Schema, 2002, pp. 1-10.

Walter J. Savitch, "Java an Introduction to Computer Science & Programming," 2000, p. 478.

Walter J. Savitch, "Java an Introduction to Computer Science & Programming," 2000, pp. 458-467.

Walter J. Savitch, "Java an Introduction to Computer Science & Programming", 2000, p. 1.

"Fortis Investments Implements Unified Employee Management System Across 12 Countries" (Business Wire, Jul. 2004).

"Extract Simplifies File Conversion" Software Markets, Dec. 2, 1991. Retrieved via Dialog on Aug. 16, 2010.

Cover Pages "Siebel's Universal Application Network" Apr. 8, 2002 downloaded from xml.coverpages.org May 6, 2010.

Cover Pages "Siebel Announces Success with Universal Application Network (UAN)" Apr. 21, 2004 downloaded from xml.coverpages.org May 6, 2010.

Michael Kay, Editor "XSL Transformations (XSLT) Version 2.0 W3C Working Draft May 2, 2003" downloaded from http://www.w3.org/TR/2003/WD-xslt20-20030502/ May 6, 2010.

Eric Gropp "Transforming XML Schemas" Jan. 15, 2003; downloaded from xml.com May 6, 2010.

Sonic Software Corporation, Power Schemas With Stylus Studio™; Jan. 2004.

\* cited by examiner

INVENTORY BALANCE COMMON OBJECT

CROSS REFERENCE TO RELATED APPLICATIONS

This application claims the benefit of U.S. Provisional Patent Application No. 60/457,434 filed Mar. 24, 2003, entitled, "INVENTORY BALANCE SYNCHRONIZATION AND COMMON OBJECT," by Kahlon et al., and which is hereby incorporated by reference in its entirety.

TECHNICAL FIELD

The present invention is directed to the field of data modeling in the context of enterprise resources planning, supply chain management, warehouse management, and customer relations management, and more specifically to inventory management.

BACKGROUND

Manufacturers and suppliers of products use back-office computerized systems to provide support for functions in enterprise resources planning (ERP), supply chain management (SCM), and warehouse management (WMS). Such functions include manufacturing, marketing, inventory control, procurement and financing.

Also available are front-office computerized systems, which provide support to product vendors and distributors. In the context of inventory management, such front-office functions include analysis of historical customer demand for products, stocking and replenishment of inventory, and providing information resources for delivery of inventory and service to consumers. In order to take advantage of such front-office software computerized systems, their users typically must store data in forms usable by the front-office computerized system, which often differ significantly from the forms usable with back-office computerized systems.

Thus, when some or all aspects of inventory are managed by both back-office and front-office computerized systems, there is a need to synchronize the inventory information in both computerized systems. Generally, in order for front-office computerized systems to communicate with back-office computerized systems that are already being used, the user must manually regenerate data from the back-office computerized systems in forms usable by the front-office computerized systems, and vice versa. Such manual regeneration has several significant disadvantages, including: (1) it is often expensive; (2) it often requires a substantial amount of time to complete; (3) it must be repeated each time data changes in either the back-office system or the front-office system; and (4) it is prone to errors.

In view of the foregoing, an automated approach for transforming data used by a back-office computerized system for use by a front-office computerized system, and vice versa, is needed.

DETAILED DESCRIPTION

Figure 1A:
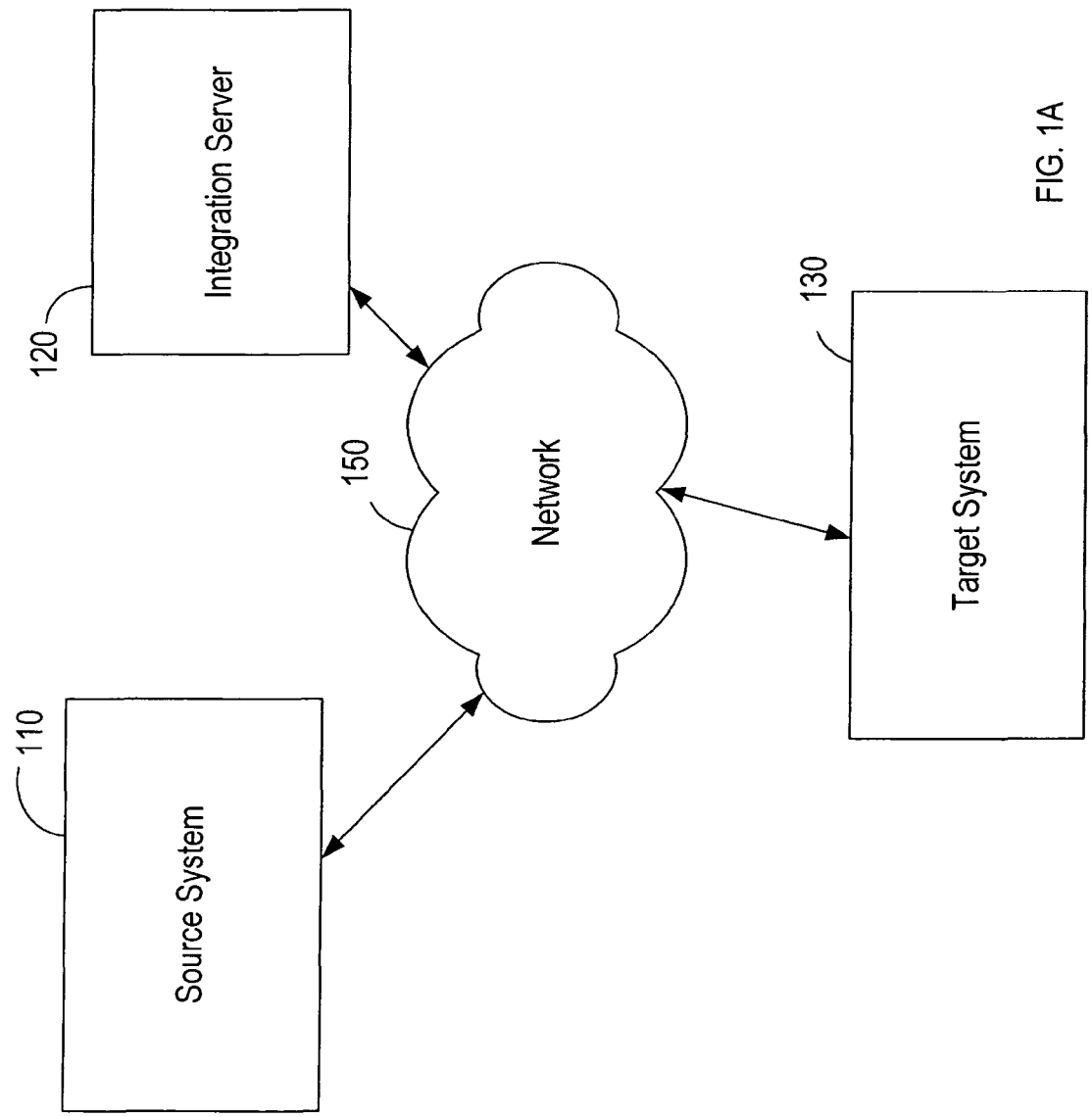
FIG. 1A is a high level network diagram showing aspects of a computerized environment in which the facility operates, according to certain embodiments.

According to certain embodiments, the synchronization of inventory information addresses the needs of a company that deploys multiple computer applications, obtained from multiple vendors of computer applications, in the company's inventory management system. The synchronization operation provides a user of the inventory management system the same view of the inventory information across the various computer applications. All changes in the inventory information need to be captured and made accessible to all relevant computer applications in the inventory management system. For example, when an inventory item is received into inventory, shipped for an order, or has a change in its availability status (such as "reserved" status from "on hand" status), such inventory information need to be captured and made accessible to relevant computer applications in the inventory management system.

For purposes of explanation, assume that a company's inventory management system includes a front-office system for customer interfacing operations. Further, assume that the company's inventory management system also includes a back-office system that includes an inventory cost accounting application, for example. The computer applications of the front-office system uses a data model that is distinct from the data model used in back-office system's computer applications.

Inventory items are physically stored in a central distribution warehouse, at a field service office, in one or more field service engineer's trunk, or at a third party vendor's location. Assume that the various computer applications associated with inventory management used by the central distribution warehouse, the field service office, the field service engineer, and the third party vendor, are part of the front-office system. An inventory cost accounting application, for example, from the back-office system will need to share inventory information with the front-office system computer applications. Thus, a common data storage model is needed so that the various computer applications across the company's inventory management system can share the inventory information.

When a front-office call center receives an order from a customer, the call center can commit the availability of inventory parts and labor to the customer even though such inventory parts are stocked by different partners across a multiplicity of systems, only if the call center and the multiplicity of systems share inventory information. An important aspect to the inventory management is to ensure that the multiplicity of applications across the systems share the same inventory balance information. Thus, any inventory balance information that occurs in the front-office needs to be synchronized with that of the back-office.

Inventory balance implies the quantity available for a product (stock keeping unit) at an inventory location for a particular inventory level. A stock keeping unit is an instance of a product (part number) at an inventory location. An example of a stock keeping unit is "30 GB Hard Drive" at "Chicago Field Office". Inventory level is also known as a product bucket. Inventory level is a classification of a stock keeping unit, based on its availability code and status code. Examples of availability codes are "on hand-good", or "on hand-defective", or "customer owned-good", etc.

To explain, the synchronization of inventory balance information is the process of synchronizing the Inventory Balance information between the back-office systems (source systems or external systems) and the front-office systems (target systems). For purposes of explanation, the synchronization of inventory balance information is described with reference to the back-office systems as source systems or external systems and the front-office systems as target systems. The inventory balance information is stored per inventory location, per product, and per bucket in all the relevant systems. Synchronization is made possible by using an integration process that assumes that the application from the source system (source application) is the master of the inventory balance information, and will update the target inventory balance information to reflect the balance in the source system. The inventory balance information in the target system is updated by creating a transaction that will result in the right balance for the particular inventory location. For example, inventory balance is updated by committing an inventory transaction.

An inventory balance record contains the Inventory location Id, the inventory product Id, the bucket code, and the quantity of products available per bucket. The integration application process for synchronizing inventory balance information may be invoked at regular intervals by the source system in order to update the target system's Inventory Balance to reflect the source system's inventory balance information.

The inventory balance integration application process (IAP) includes the following operations:
  Extracting Inventory Balance information from Source Application.
  Transforming the Source-specific Inventory Balance information to a common object.
  Invoking the Sync Inventory Balance Integration Flow.
  Transforming the common object to the target application's format.
  Querying the target system for the Inventory Location's current balance
  Creating a new target Inventory Transaction Object based on the difference between the source and the target system's Inventory Balance.

The above inventory balance integration process occurs at periodic intervals when the inventory balances between inventory systems are not the same. There may be multiple reasons for the inventory balances between inventory systems to be different. For example,
  Inventory transactions synchronization may have failed for some transactions
  Inventory transaction synchronization may not have been activated. The requirement is to update the balance at periodic intervals.
  Inventory transaction IAP is not applicable to enterprises in a distribution network such as between a manufacturer and distributor.

In some cases, the back office system may be the system that performs inventory transactions and the front-office may be used to reflect the inventory balances. In that case, the back office application will pass the inventory balance to integration server. The integration server will convert the balance into an inventory transaction (after accounting for the difference between the current balance in the front-office versus the current balance in the back-office) and submit such a transaction to the front-office system's database. Thus, the inventory balance information in the front-office system (target system) is updated by generating an inventory transaction to account for the difference (delta).

Inventory balance information includes the source inventory location name, the product, and the balance of inventory. If the product is serialized, then a list of asset/serial number is specified. The number of assets specified is equal to the balance field. The integration server will request the current balance from the target application (which is an application of the front-office system). At that point, the integration server may lock the balance record so that no more changes can be made to the record until the synchronize inventory balance transaction complete. The integration server will compare the balances and create an inventory transaction for the delta.

The following is a process flow for synchronizing inventory balance information between source and target systems.
  A process is triggered in source application (external application) to send the inventory balance at a regular interval.
  Integration server receives the inventory balance information from source system.
  The integration server fetches the balance that is in the front-office system (target system).
  Compares the balances to create an inventory transaction.
  User verifies that the necessary information is filled in or defaulted:
    Source Inventory location—External Location
    Product
    Quantity
    Source Inventory level availability
    Source Inventory level status
    Destination Inventory location
    Destination Inventory level availability
    Destination Inventory level status.
    Serial # (if applicable)
    Parent asset # (if applicable—when the inventory item is being installed/replaced on-site)
    Description—Synchronize Inventory balance
    Commit—True
  The transaction is committed in the target system database.
  The inventory balance information may be same in both systems. For a non-serialized product, no transaction is generated in such a case. However, for serialized products, if the serial numbers are different then an inventory transaction would still need to be generated in order to synchronize the serial numbers.
  The inventory transaction is committed and the inventory balance updated.

The following is the common object definition for Inventory Balance information, according to certain embodiments of the invention. The information that the common object for Inventory balance may include the following:

| Field | Description | Example |
|---|---|---|
| Inventory ID | Unique ID of the Inventory Location | ROWID of Inventory Location |
| DUNS # Products | Default Org DUNS # | |
| Product ID | Unique Product ID | ROWID for the Product |
| Product UOM | Unit Of Measure | Unit Of Measure for Product |
| GlobalProductId | Global Product Identifier | |
| Inventory Level | | |
| Availability | LOVs from FS_PRODINVCAT_AVAIL | On Hand/In Transit/On Order/etc. |
| Status | LOVs from FS_PRODINVCAT_STATUS | Good/Defective |
| Quantity | Integer | 10 |

A software facility (hereafter "the facility") for automatically converting inventory balance information, is described. In some embodiments, the facility converts inventory balance information from a form used by the source system to a form used by the target system. In certain embodiments, back-office systems are those that provide support for such functions as manufacturing, marketing, inventory control, procurement and financing. In certain embodiments, front-office system are those that provide support for such functions as analysis of historical customer demand for products, stocking and replenishment of inventory, and providing information resources for delivery of inventory and service to consumers, and sales.

In some embodiments, such as embodiments adapted to converting inventory balance information in the first source format, the facility converts inventory balance information by converting the inventory balance information that is in the first source format into an intermediate format. The intermediate format is then used to convert the inventory balance information into the target format.

By performing such conversions, embodiments of the facility enable a user of a first computerized system who has stored inventory balance information in a first format for use by the first computerized system to readily make the stored inventory balance information available for use in a second computerized system that utilizes a second format in a cost-efficient and time-efficient manner.

FIG. 1A is a network diagram showing aspects of a typical hardware environment in which the facility operates. FIG. 1A shows a source system 110, a target system 130, an integration server 120 and a network 150. Source system 110 stores inventory balance information in a source format. There may be more than one source system. Target system 130 stores inventory balance information in a target format. There may be more than one target system.

The facility (not shown) converts some or all inventory balance information that is in the source format into the target format by using an intermediate format of the inventory balance information. In certain embodiments, such conversions are performed with the aid of one or more other computer systems, such as integration server system 120. Components of the facility may reside on and/or execute on any combination of these computer systems, and intermediate results from the conversion may similarly reside on any combination of these computer systems.

The computer systems shown in FIG. 1A are connected via network 150, which may use a variety of different networking technologies, including wired, guided or line-of-sight optical, and radio frequency networking. In some embodiments, the network includes the public switched telephone network. Network connections established via the network may be fully-persistent, session-based, or intermittent, such as packet-based. While the facility typically operates in an environment such as is shown in FIG. 1A and described above, those skilled in the art will appreciate the facility may also operate in a wide variety of other environments.

Figure 2:
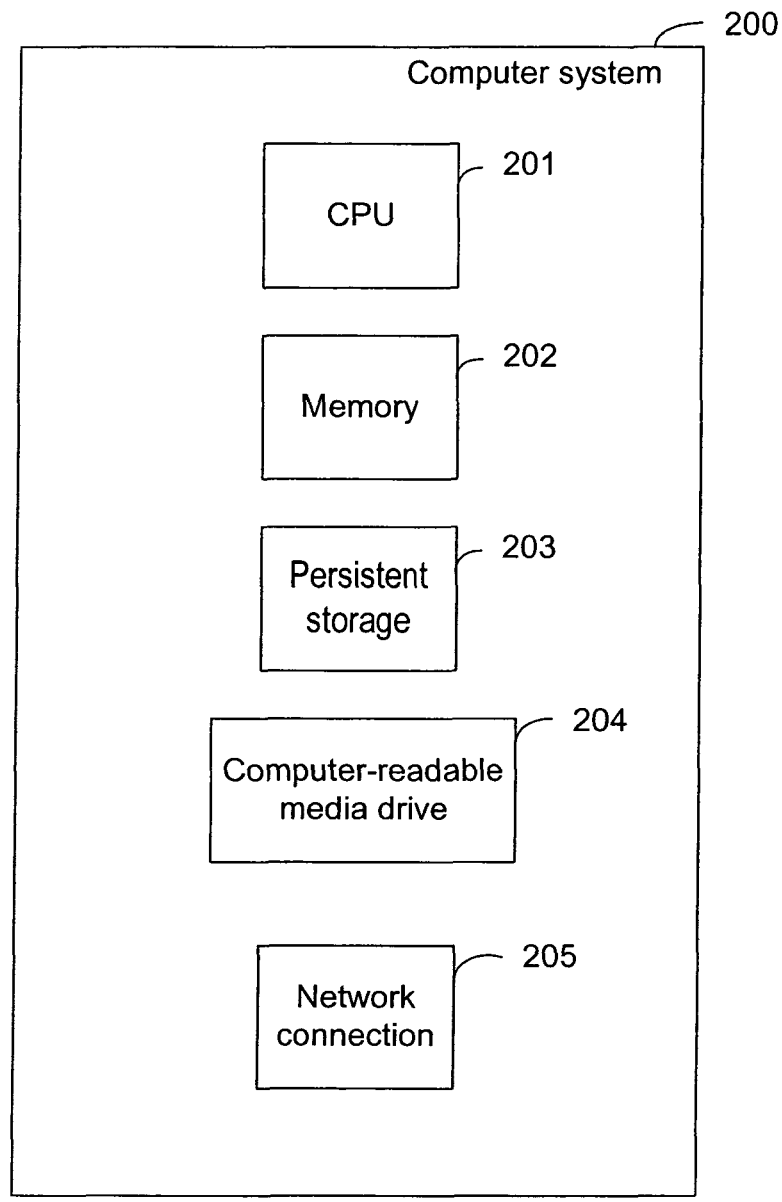
FIG. 2 is a block diagram showing some of the components typically incorporated in at least some of the computer systems and other devices on which the facility executes.

FIG. 2 is a block diagram showing some of the components typically incorporated in at least some of the computer systems and other devices on which the facility executes, including some or all of the server and client computer systems shown in FIG. 1A. These computer systems and devices 200 may include one or more central processing units ("CPUs") 201 for executing computer programs; a computer memory 202 for storing programs and data—including data structures—while they are being used; a persistent storage device 203, such as a hard drive, for persistently storing programs and data; a computer-readable media drive 204, such as a CD-ROM drive, for reading programs and data stored on a computer-readable medium; and a network connection 205 for connecting the computer system to other computer systems, such as via the Internet, to exchange programs and/or data—including data structures. While computer systems configured as described above are typically used to support the operation of the facility, those skilled in the art will appreciate that the facility may be implemented using devices of various types and configurations, and having various components.

It will be understood by those skilled in the art that the facility may transform inventory balance information from a number of different source systems and from a number of different source software packages to a number of target systems and/or to a number of target software packages.

Figure 1B:
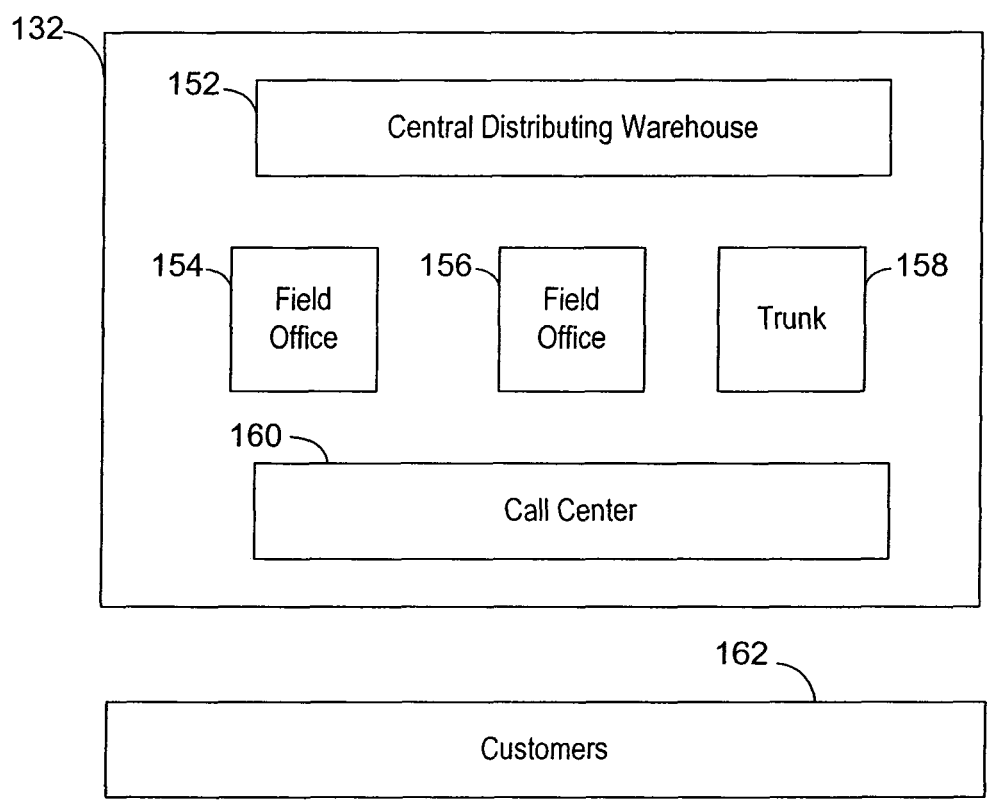
FIG. 1B is a block diagram that illustrates some business components of target system 130, according to certain embodiments.

FIG. 1B is a block diagram that illustrates some business components of a front-office inventory system 132. According to certain embodiments, such business components include a central distributing warehouse 152, a multiplicity of field offices 154, 156, a plurality of trunks, such as trunk 158, and one or more call centers, such as call center 160. Such business components in front-office inventory system 132 use and store inventory balance data in the front-office system format. Further, one of the primary functions of front-office inventory system 132 is to serve and interface with customers 162.

Figure 3A:
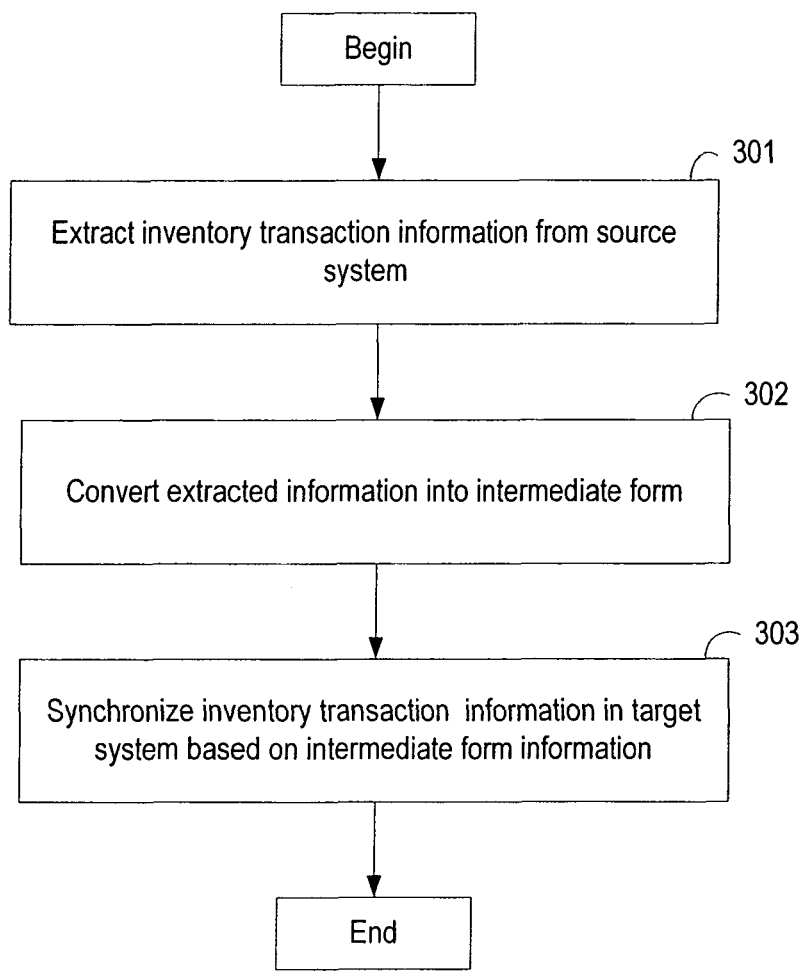
FIG. 3A is a high level flow diagram that shows some steps performed by the facility.

FIG. 3A is a high level flow diagram that shows some steps typically performed by the facility in order to convert inventory balance information from the one or more source formats to the target format. At block 301, the facility extracts inventory balance information from one or more source systems. At block 302, the facility converts the extracted information into an intermediate format. The intermediate format is described in greater detail herein, with reference to the common object data model. At block 303, the facility synchronizes the inventory balance information from the source system with that of the target system by converting the inventory balance information in intermediate format into the target format. After block 303, the steps as shown in FIG. 3A conclude.

Figure 3B:
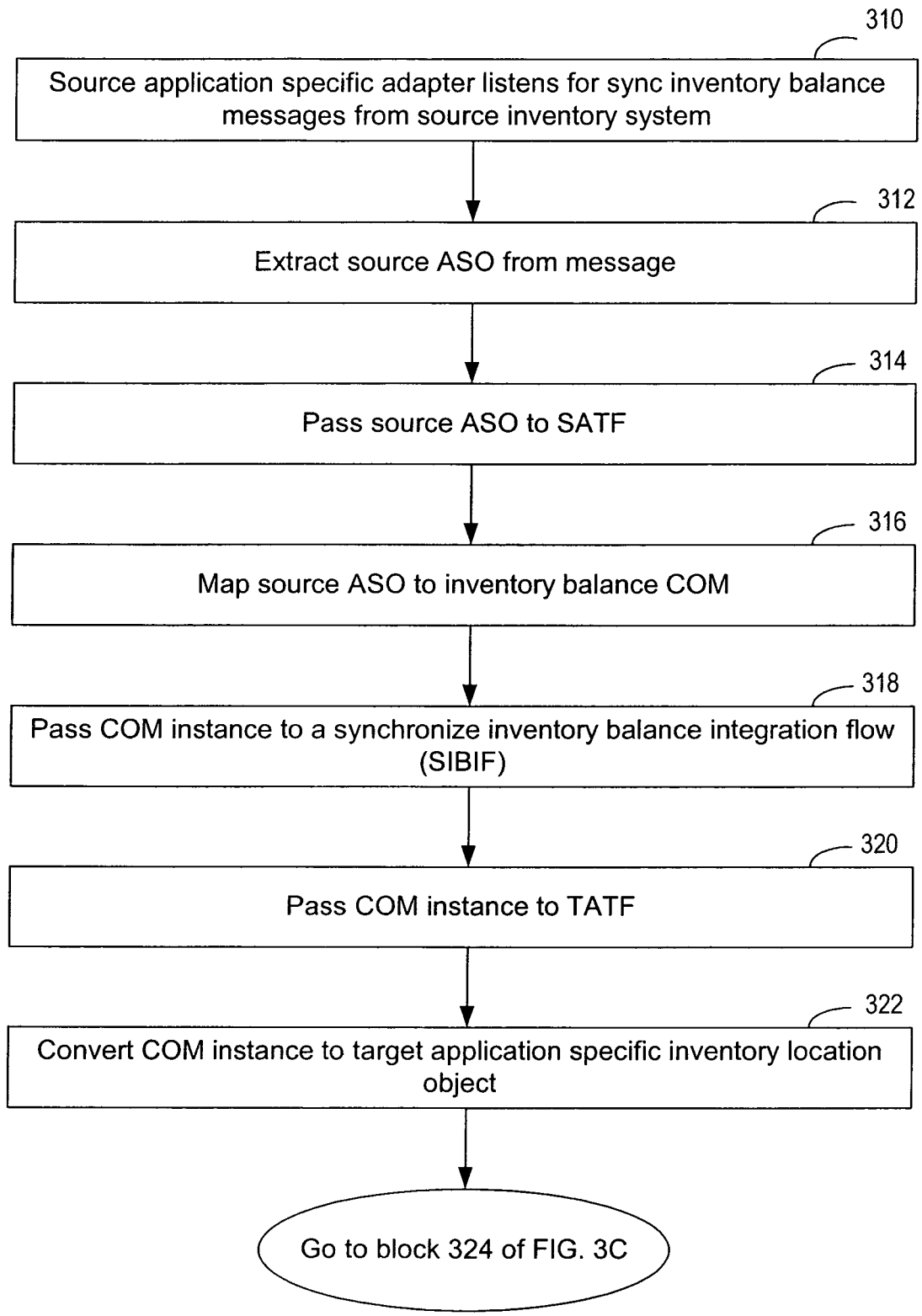
FIG. 3B and FIG. 3C are flow charts that illustrate further aspects of the data integration operation, according to certain embodiments.
Figure 3C:
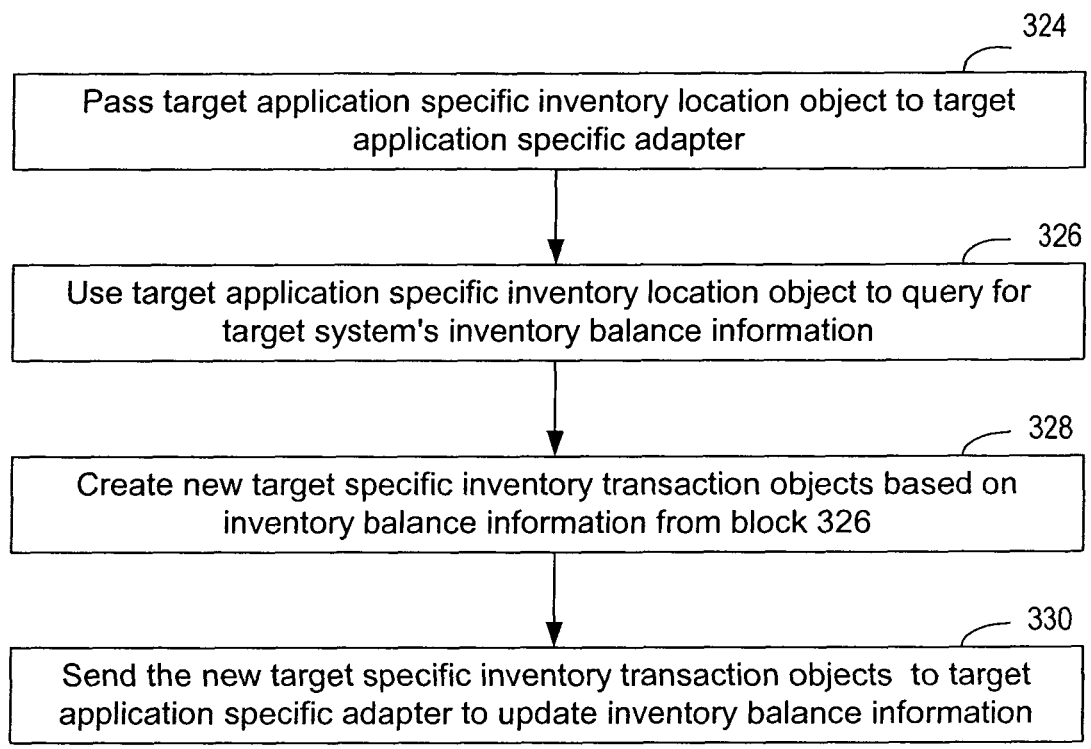

FIG. 3B and FIG. 3C are flow charts that illustrate further aspects of the data integration operation, according to certain embodiments. In FIG. 3B, at block 310, a source application specific adapter listens for the synchronize inventory balance messages from a source application program in the source system. At block 312, a source application specific object (source ASO) that is associated with the message is extracted. At block 314, the source application specific adapter passes the source ASO to a source application transformation flow (SATF) across an application specific interface (ASI). At block 316, the SATF maps the source ASO to the inventory balance common object model (COM) to create a corresponding inventory balance COM instance. At block 318, the inventory balance COM instance is passed to the Synchronize Inventory Balance Integration Flow (SIBIF), via the common service interface (CSI). At block 320, the SIBIF passes the inventory balance COM instance to the target application transformation flow (TATF), via CSI. At block 322, the TATF transforms inventory balance COM instance to the target application specific inventory location object.

In FIG. 3C, at block 324, the target application specific inventory location object is passed to the target application specific adapter via ASI. At block 326, the target application specific adapter uses the target application specific inventory location object to query the target system for the target system's inventory balance information. At block 328, the TATF uses the target system's inventory balance information to create new target specific inventory transaction objects. At block 330, the new target specific inventory transaction objects are sent to the target application specific adapter to update the inventory balance information in the target system. Thus, the inventory balance information in the target system is synchronized with that of the source system.

FIG. 4 to FIG. 11 are data structures of the inventory common object model associated with inventory balance information. Such an inventory common object model illustrates sample intermediate data structures produced from corresponding inventory balance information in the source format.

Figure 4:
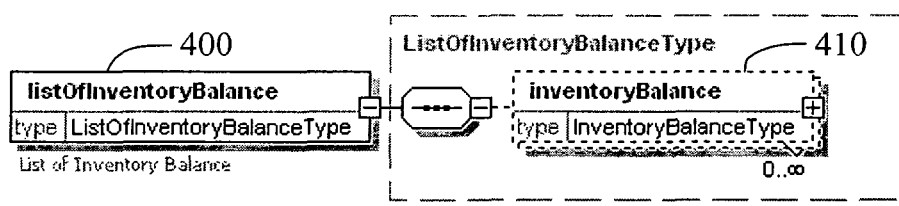
FIG. 4 to FIG. 11 are data structure diagrams that illustrate the inventory balance common object model, according to certain embodiments.

In FIG. 4, the intermediate data structure 400 is of type listOfInventoryBalance (list of inventory balance), which may contain any number of inventoryBalance data structures 410 (inventory balance). One such illustrated inventoryBalance data structure 500 is shown in FIG. 5.

Figure 5:
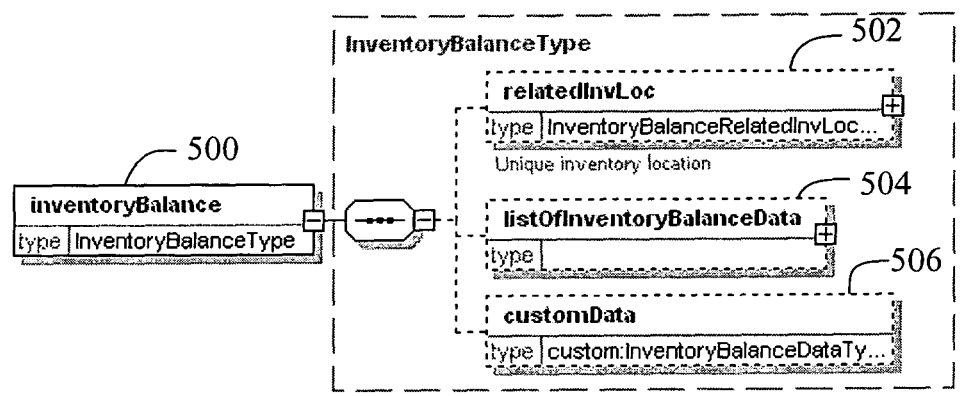

In FIG. 5, inventoryBalance data structure 500 includes a relatedInvLoc 502 section (inventory balance related inventory location), and a listOfInventoryBalanceData section 504 (a list of inventory balance data). In FIG. 5, inventoryBalance data structure 500 may also include various other information such as various inventory transaction customData 506 (inventory balance custom data). The relatedInvLoc section 502 is discussed in greater detail herein with reference to FIG. 6. The listOfInventoryBalanceData section 504 is discussed in greater detail herein with reference to FIG. 7.

Figure 6:
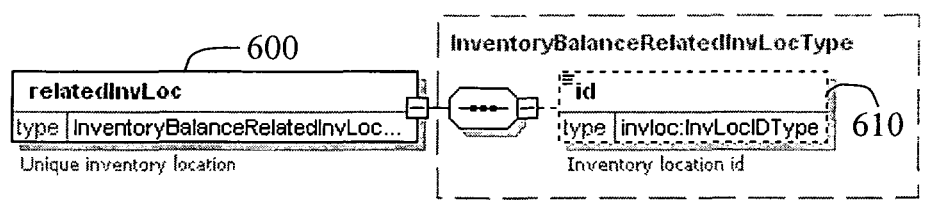
Figure 7:
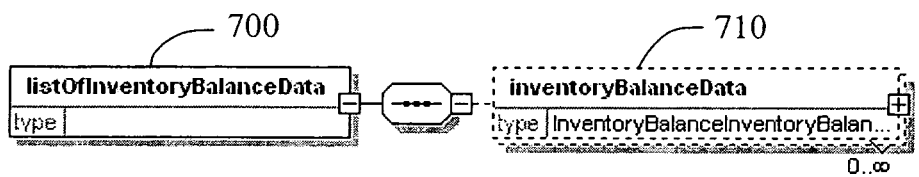
Figure 8:
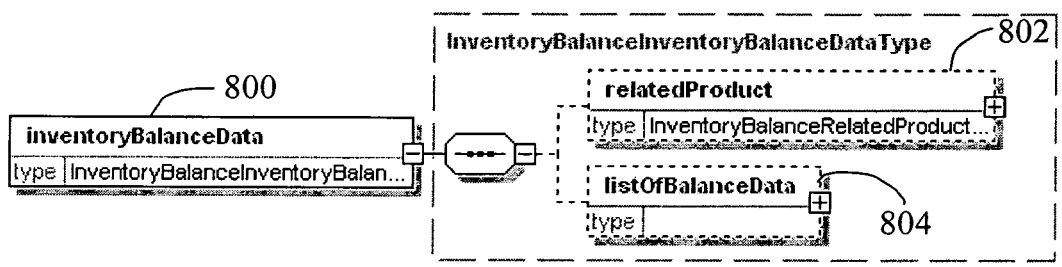
Figure 9:
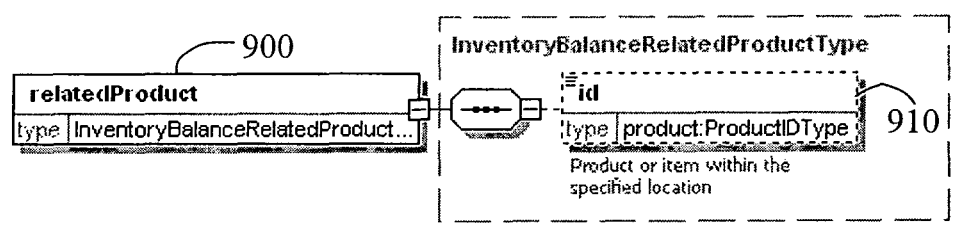
Figure 10:
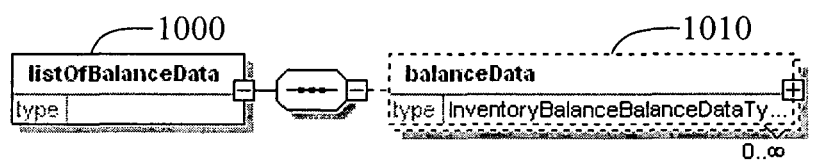

In FIG. 6, the relatedInvLoc section 600 includes an inventory balance related inventory location ID 610. In FIG. 7, listOfInventoryBalanceData section 700 includes any number of inventoryBalanceData sections 710 (inventory balance data). In FIG. 8, inventoryBalanceData section 800 includes a relatedProduct section 802 and a listOfBalanceData section 804. In FIG. 9, the relatedProduct section 900 includes an ID 910, which is an identifier for a product or item within the specified inventory location. In FIG. 10, the listOfBalanceData section 1000 includes a balanceData section 1010.

Figure 11:
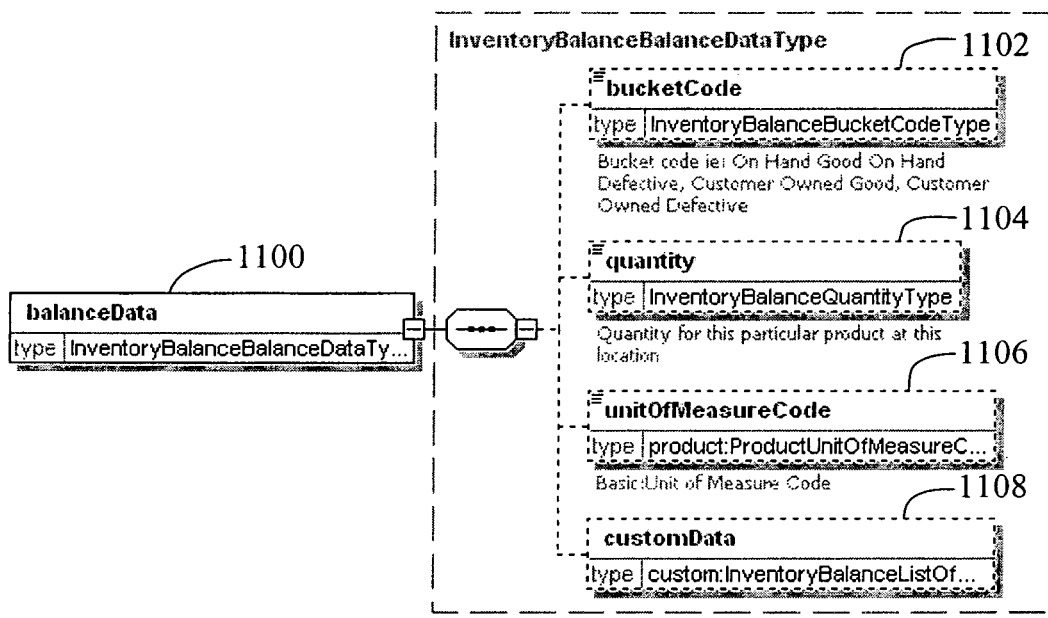

In FIG. 11, the balanceData section 1100 includes an inventory balance bucketCode 1102, an inventory balance quantity 1104, a product UnitOfMeasureCode 1106 and an inventory balance customData 1108. The inventory balance bucketCode 1102 can have values such as, "On Hand Good", "On Hand Defective", "Customer Owned Good", "Customer Owned Defective", etc. The inventory balance quantity 1104 is the quantity for the particular product at the particular inventory location.

It will be appreciated by those skilled in the art that the above-described facility may be straightforwardly adapted or extended in various ways. For example, the facility may be used to transform various other kinds of inventory balance information, and may be used to transform inventory balance information between a variety of other formats.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any express definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A computer-implemented method for managing inventory, the method comprising:
  synchronizing inventory balance information between a source computerized inventory management system and a target computerized inventory management system, wherein
    the source computerized inventory management system and the target computerized inventory management system are among a plurality of computerized inventory management systems,
    the synchronizing is bi-directional, wherein
      the synchronizing is performed by an integration server, and
    the synchronizing comprises
      extracting inventory balance information in a source format, wherein
        the source format is a format used by the source computerized inventory management system, and
        the inventory balance information in the source format is associated with the source computerized inventory management system,
      converting the inventory balance information in the source format into source inventory balance information in an intermediate format,
      receiving target inventory balance information, wherein
        the target inventory balance information is associated with the target computerized inventory management system,
      converting the target inventory balance information into target inventory balance information in the intermediate format,
      generating an inventory balance delta, wherein
        the inventory balance delta is calculated as a difference between a source inventory balance and a target inventory balance,
        the source inventory balance information in the intermediate format comprises the source inventory balance, the target inventory balance information in the intermediate format comprises the target inventory balance, and the generating is performed by the integration server, and converting the inventory balance delta into inventory balance information in a target format, wherein the target format is a format used by the target computerized inventory management system, the inventory balance information in the target format comprises the inventory balance delta, and the inventory balance information in the target format is associated with the target computerized inventory management system.

2. The computer-implemented method of claim 1, wherein the receiving the target inventory balance information is performed in response to querying the target computerized inventory management system by the integration server.

3. The computer-implemented method of claim 1, further comprising:

extracting inventory balance information in a second source format that is associated with a second source computerized inventory management system that is distinct from the first source computerized inventory management system, wherein the second source computerized inventory management system is one of the plurality of computerized inventory management systems;

converting the inventory balance information in the second source format into inventory balance information that is in the intermediate format;

converting the inventory balance information in the intermediate format into inventory balance information in the target format; and using the inventory balance information in the target format to update an existing inventory balance record in the target computerized inventory management system.

4. The computer-implemented method of claim 1, further comprising:

updating existing inventory balance information using the inventory balance information in the target format, wherein the existing inventory balance information is in the target format, the existing inventory balance information is associated with the target computerized inventory management system, and the updating is based, at least in part, on the inventory balance delta.

5. The computer-implemented method of claim 1, wherein the intermediate format comprises a hierarchy of data elements comprising a plurality of inventory balance elements comprising:

a list of inventory balances element;

an inventory balance related inventory location element;

a list of related inventory balances for defining a plurality of related inventory balances; and a custom data element for defining customized attributes for the inventory.

6. The computer-implemented method of claim 5, wherein each of the plurality of inventory balance elements comprises a related inventory location element for defining related inventory location identifier.

7. The computer-implemented method of claim 5, wherein each of the plurality of inventory balance elements comprises a list of inventory balance data element for defining a plurality of inventory balance data elements.

8. The computer-implemented method of claim 5, wherein each of the plurality of inventory balance elements comprises an inventory balance custom data.

9. The computer-implemented method of claim 7, wherein each of the plurality of inventory balance data elements comprises a related product element for defining a product identifier.

10. The computer-implemented method of claim 7, wherein each of the plurality of inventory balance data element comprises a list of balance data element for defining a plurality of balance data elements.

11. The computer-implemented method of claim 10, wherein each of the plurality of balance data elements comprises:

a bucket code element;

a quantity of product element;

a product unit of measure code element; and a balance data custom data element.

12. A computer-readable storage medium carrying one or more sequences of instructions for managing inventory, wherein execution of the one or more sequences of instructions by one or more processors causes the one or more processors to perform:

synchronizing inventory balance information between a source computerized inventory management system and a target computerized inventory management system, wherein the source computerized inventory management system and the target computerized inventory management system are among a plurality of computerized inventory management systems, the synchronizing is bi-directional, wherein the synchronizing is performed by an integration server, and the synchronizing comprises extracting inventory balance information in a source format, wherein the source format is a format used by the source computerized inventory management system, and the inventory balance information in the source format is associated with the source computerized inventory management system, converting the inventory balance information in the source format into source inventory balance information in an intermediate format, receiving inventory balance information, wherein the target inventory balance information is associated with the target computerized inventory management system, converting the target inventory balance information into target inventory balance information in the intermediate format, generating an inventory balance delta, wherein the inventory balance delta is calculated as a difference between a source inventory balance and a target inventory balance, the source inventory balance information in the intermediate format comprises the source inventory balance, the target inventory balance information in the intermediate format comprises the target inventory balance, and the generating is performed by the integration server, and
converting the inventory balance delta into inventory balance information in a target format, wherein
the target format is a format used by the target computerized inventory management system,
the inventory balance information in the target format comprises the inventory balance delta, and
the inventory balance information in the target format is associated with the target computerized inventory management system.

13. The computer-readable storage medium of claim 12, wherein the receiving inventory balance information is performed in response to querying the target computerized inventory management system by the integration server.

14. The computer-readable storage medium of claim 12, further comprising:
extracting inventory balance information in a second source format that is associated with a second source computerized inventory management system that is distinct from the first source computerized inventory management system, wherein
the second source computerized inventory management system is one of the plurality of computerized inventory management systems;
converting the inventory balance information in the second source format into inventory balance information that is in the intermediate format;
converting the inventory balance information in the intermediate format into inventory balance information in the target format; and
using the inventory balance information in the target format to update an existing inventory balance record in the target computerized inventory management system.

15. The computer-readable storage medium of claim 12, further comprising:
updating existing inventory balance information using the inventory balance information in the
target format, wherein
the existing inventory balance information is in the target format,
the existing inventory balance information is associated with the target computerized inventory management system, and
the updating is based, at least in part, on the inventory balance delta.

16. The computer-readable storage medium of claim 12, wherein the intermediate format comprises a hierarchy of data elements comprising a plurality of inventory balance elements comprising:
a list of inventory balances element;
an inventory balance related inventory location element;
a list of related inventory balances for defining a plurality of related inventory balances; and
a custom data element for defining customized attributes for the inventory.

17. The computer-readable storage medium of claim 16, wherein each of the plurality of inventory balance elements comprises a related inventory location element for defining related inventory location identifier.

18. The computer-readable storage medium of claim 16, wherein each of the plurality of inventory balance elements comprises a list of inventory balance data element for defining a plurality of inventory balance data elements.

19. The computer-readable storage medium of claim 16, wherein each of the plurality of inventory balance elements comprises an inventory balance custom data.

20. The computer-readable storage medium of claim 18, wherein each of the plurality of inventory balance data elements comprises a related product element for defining a product identifier.

21. The computer-readable storage medium of claim 18, wherein each of the plurality of inventory balance data elements comprises a list of balance data element for defining a plurality of balance data.

22. The computer-readable storage medium of claim 21, wherein each of the plurality of balance data elements comprises:
a bucket code element;
a quantity of product element;
a product unit of measure code element; and
a balance data custom data element.

23. The computer-implemented method of claim 1, further comprising:
receiving second target inventory balance information, wherein
the second inventory balance information is associated with a second source computerized inventory management system,
converting the second inventory balance information into second source inventory balance information in the intermediate format, and
the generating the inventory balance delta further comprises calculating a second difference between a second source inventory balance and the difference between the source inventory balance and the target inventory balance, wherein
the second source inventory balance information in the intermediate format comprises the second source inventory balance.

24. The computer-implemented method of claim 1, wherein
the source inventory balance information comprises the source inventory balance for a plurality of products;
the target inventory balance information comprises the target inventory balance for the plurality of products; and
the inventory balance delta comprises a plurality of differences between the source inventory balance and the target inventory balance, wherein
each of the plurality of differences indicates a difference between the source inventory balance for one of the plurality of products and a corresponding target inventory balance for the one of the plurality of products.

25. The computer-implemented method of claim 24, wherein the converting the inventory balance delta into inventory balance information in the target format comprises:
converting the inventory balance delta into a plurality of inventory balance information in the target format, wherein
each of the plurality of inventory balance information in the target format is associated with a different one of the plurality of products.

26. The computer-implemented method of claim 1, wherein
the source inventory balance information further comprises a respective source inventory balance at each location of a plurality of locations.

27. The computer-implemented method of claim 1, wherein
the intermediate format comprises a hierarchy of data elements comprising a plurality of inventory balance elements, wherein the plurality of inventory balance elements comprise
a list of inventory balances element,
an inventory balance related inventory location element,
a list of related inventory balances for defining a plurality of related inventory balances, and
a custom data element for defining customized attributes for the inventory,
each of the plurality of inventory balance elements comprises
a related inventory location element for defining a related inventory location identifier,
a list of inventory balance data element for defining a plurality of inventory balance data elements, and
an inventory balance custom data,
each of the plurality of inventory balance data elements comprises
a related product element for defining a product identifier,
a list of balance data element for defining a plurality of balance data elements,
each of the plurality of balance data elements comprises
a bucket code element,
a quantity of product element,
a product unit of measure code element, and
a balance data custom data element
the source inventory balance information comprises a source inventory balance for a plurality of products,
the target inventory balance information comprises a target inventory balance for the plurality of products,
the inventory balance delta comprises a plurality of inventory differences, wherein each of the plurality of inventory differences differences indicates a difference between the source inventory balance for one of the plurality of products and a corresponding target inventory balance for the one of the plurality of products,
the converting the inventory balance delta into inventory balance information in the target format comprises
converting the inventory balance delta into a plurality of inventory balance information in the target format, wherein each of the plurality of inventory balance information in the target format is associated with a respective one of the plurailty of products, and
the source inventory balance information further comprises a respective source inventory balance at each location of a plurality of locations.

\* \* \* \* \*

UNITED STATES PATENT AND TRADEMARK OFFICE
CERTIFICATE OF CORRECTION

| | | |
|---|---|---|
| PATENT NO. | : 9,704,120 B2 | Page 1 of 1 |
| APPLICATION NO. | : 10/696097 | |
| DATED | : July 11, 2017 | |
| INVENTOR(S) | : Kahlon et al. | |

It is certified that error appears in the above-identified patent and that said Letters Patent is hereby corrected as shown below:

On the Title Page

Column 2, item (56) under Other Publications, Line 4, delete "umit.com." and insert -- unit.com. --, therefor.

On page 3, Column 1, item (56) under Other Publications, Line 8, delete "Conventry" and insert -- Coventry --, therefor.

In the Specification

In Column 3, Line 46, delete "balance" and insert -- balance. --, therefor.

In Column 3, Line 56, delete "transactions" and insert -- transactions. --, therefor.

In Column 4, Line 46, delete "status." and insert -- status --, therefor.

In the Claims

In Column 14, Line 12, in Claim 27, delete "differences differences" and insert -- differences --, therefor.

In Column 14, Line 22, in Claim 27, delete "plurailty" and insert -- plurality --, therefor.

Signed and Sealed this
Thirteenth Day of February, 2018

Andrei Iancu
*Director of the United States Patent and Trademark Office*